United States Patent [19]

Zarount

[11] 4,224,472
[45] Sep. 23, 1980

[54] METHOD AND APPARATUS FOR APPORTIONING CALL CHARGES

[75] Inventor: Alfred Zarount, Middletown, N.J.

[73] Assignee: Bell Telephone Laboratories, Incorporated, Murray Hill, N.J.

[21] Appl. No.: 57,714

[22] Filed: Jul. 16, 1979

[51] Int. Cl.³ .......................................... H04M 15/08
[52] U.S. Cl. ............................. 179/7.1 R; 179/6.3 R; 179/18 B
[58] Field of Search ..................... 179/6.3 R, 6.5, 7 R, 179/7.1 R, 7.1 TP, 18 B, 18 D

[56] References Cited

U.S. PATENT DOCUMENTS

| | | | |
|---|---|---|---|
| 3,801,745 | 4/1974 | Zuckerman | 179/7.1 R |
| 4,046,962 | 9/1977 | Rogers | 179/6.3 R |
| 4,054,756 | 10/1977 | Comella et al. | 179/6.3 R |

*Primary Examiner*—Gerald L. Brigance
*Attorney, Agent, or Firm*—Charles H. Davis

[57] ABSTRACT

Apparatus is disclosed for apportioning charges on calls originating from coin telephones. At the end of the initial talking period which was paid for by the coin station, an overtime signal is sent to the called station. The called station signals if it will accept overtime charges and recognizing the signal from the called station, the control equipment prepares a bill for the overtime to be assessed to the called station.

11 Claims, 8 Drawing Figures

| FIG. 1 | FIG. 2 |

FIG. 3

(COIN CALL CHARGE REGISTER)

| CALLING LINE NUMBER ||
|---|---|
| CALLED LINE NUMBER ||
| TIME OF DAY | ELAPSED TIME |
| CHARGE RATE INFO ||
| TRUNK NUMBER ||
| SUSPEND OVERTIME TIMING ||

FIG. 4

(AUTOMATIC MESSAGE ACCOUNTING REGISTER)

| COIN CALL CHARGE REGISTER NO. ||
|---|---|
| CALLED NUMBER ||
| TIME OF DAY | OVERTIME START |
| TIME OF DAY | OVERTIME STOP |
| OVERTIME RATE ||

FIG. 5

(ELIGIBLE NUMBER LIST)

| AREA CODE | | | OFFICE CODE | | | DIRECTORY NO. | | | |
|---|---|---|---|---|---|---|---|---|---|
| 2-9 | 0/1 | X | A | B | C | X | X | X | X |
| | | | | | | | | | |
| | | | | | | | | | |

METHOD AND APPARATUS FOR APPORTIONING CALL CHARGES

TECHNICAL FIELD

This invention relates to telephone systems and, particularly, to arrangements for charging for calls. In a more particular aspect, this invention relates to arrangements for automatically apportioning charges between calling and called customers. In a still more particular aspect, this invention relates to automatic arrangements for reversing overtime charges on calls made from a coin telephone station.

BACKGROUND ART

Generally calls are originated from pay stations upon the deposit of coins and the dialing of the called customer's directory number. The calling customer makes an initial deposit of coins to pay for a prescribed talking period. The call is then timed and, if the parties are still talking after the initial period, overtime charges are computed and assessed against the calling coin station.

Of course, services are available for making credit card and collect calls from a station and for billing a call to a third party's directory number. The party making these calls must indicate that the call is a special service call at the outset and, generally, an attendant intervenes to verify if the designated party will accept the charges for third party and collect calls.

It has been recognized that certain business establishments receive numerous incoming calls and may wish to accept a portion of the charges for these calls in order to promote good business relationships. For example, a business customer may receive many inquiries from clients who call from coin stations. The business customer may decide that the initial cost for the call should be borne by the calling party. If, however, the call is put on "hold" or the call is prolonged while the client's inquiry is being processed, the business customer may wish to accept the overtime charges so as not to irritate his client.

Accordingly, a need exists for an arrangement for automatically apportioning charges for calls between the calling and called customers while the call is in progress.

DISCLOSURE OF THE INVENTION

The foregoing problem is solved and a technical advance is achieved by an arrangement for signaling the called station that a call in progress is about to incur overtime charges. If the called station is willing to accept the overtime charges, the called station returns a signal to the control equipment serving the calling station. The control equipment identifies the calling and called lines and begins timing the call in order to bill the called customer for the remainder of the call.

In accordance with a feature of the invention, an announcement is made to the calling party as to which station will be charged for the overtime.

In accordance with another feature of the invention, arrangements are provided for preventing customers from fraudulently causing charges to be assessed to a called station that is not provided with the proposed service. In one embodiment of the invention, the control equipment is provided with a memory containing the telephone numbers of all customers to whom overtime charges can be billed. In another embodiment, a separate data link is used to verify that the called customer is willing to accept overtime charges.

BRIEF DESCRIPTION OF THE DRAWING

FIG. 3 shows a coin call charge register at the switching office serving the coin station;

FIG. 4 shows an automatic message accounting register at the switching office serving the coin station;

FIG. 5 shows an eligible number list register at the switching office serving the coin station.

DETAILED DESCRIPTION

Figure 1:
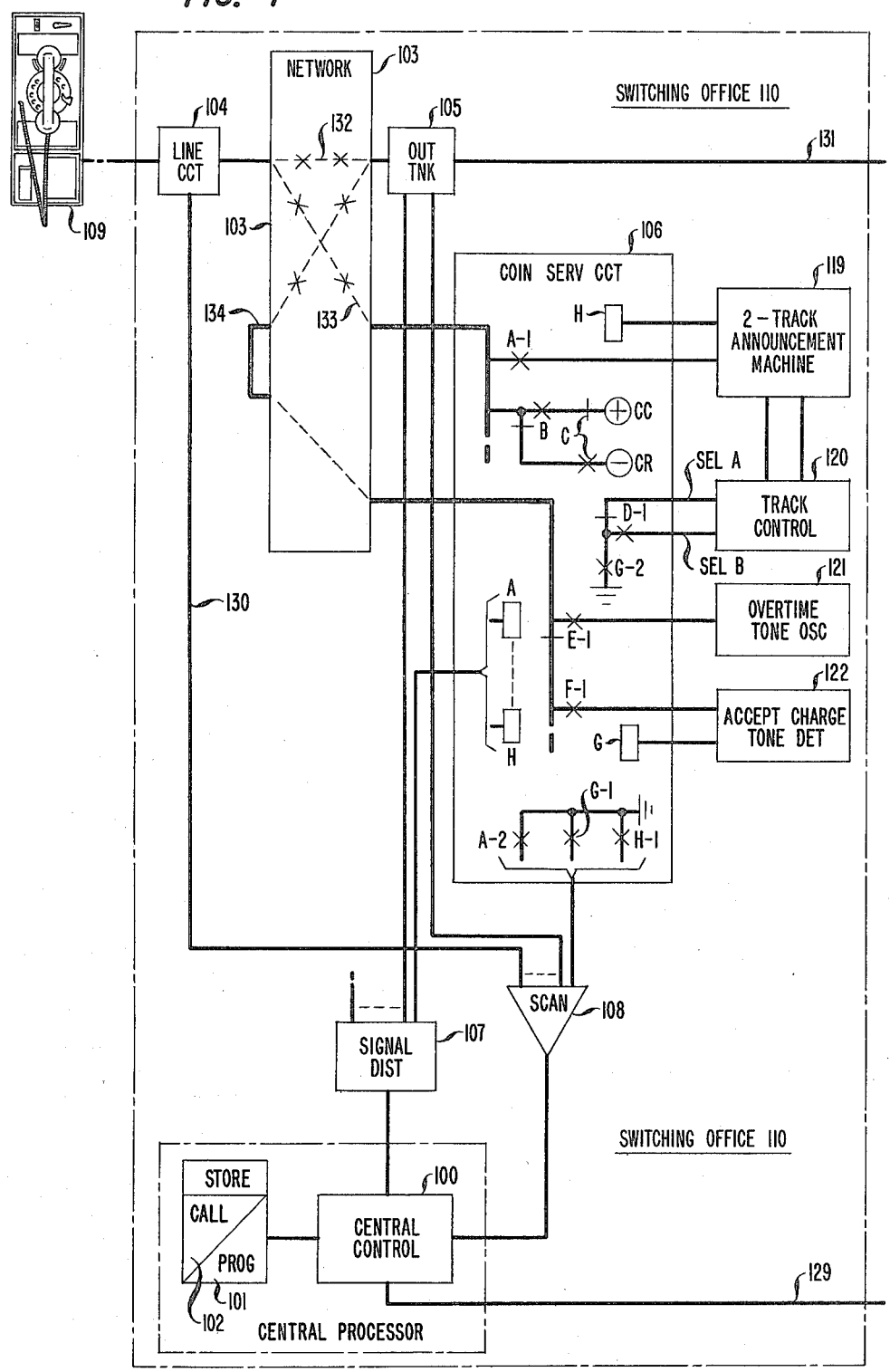
FIGS. 1 and 2, when arranged according to FIG. 9 show a block diagram of first and second switching offices serving a coin station and a called station, respectively, and the apparatus for apportioning charges between the stations.
Figures 2, 9:
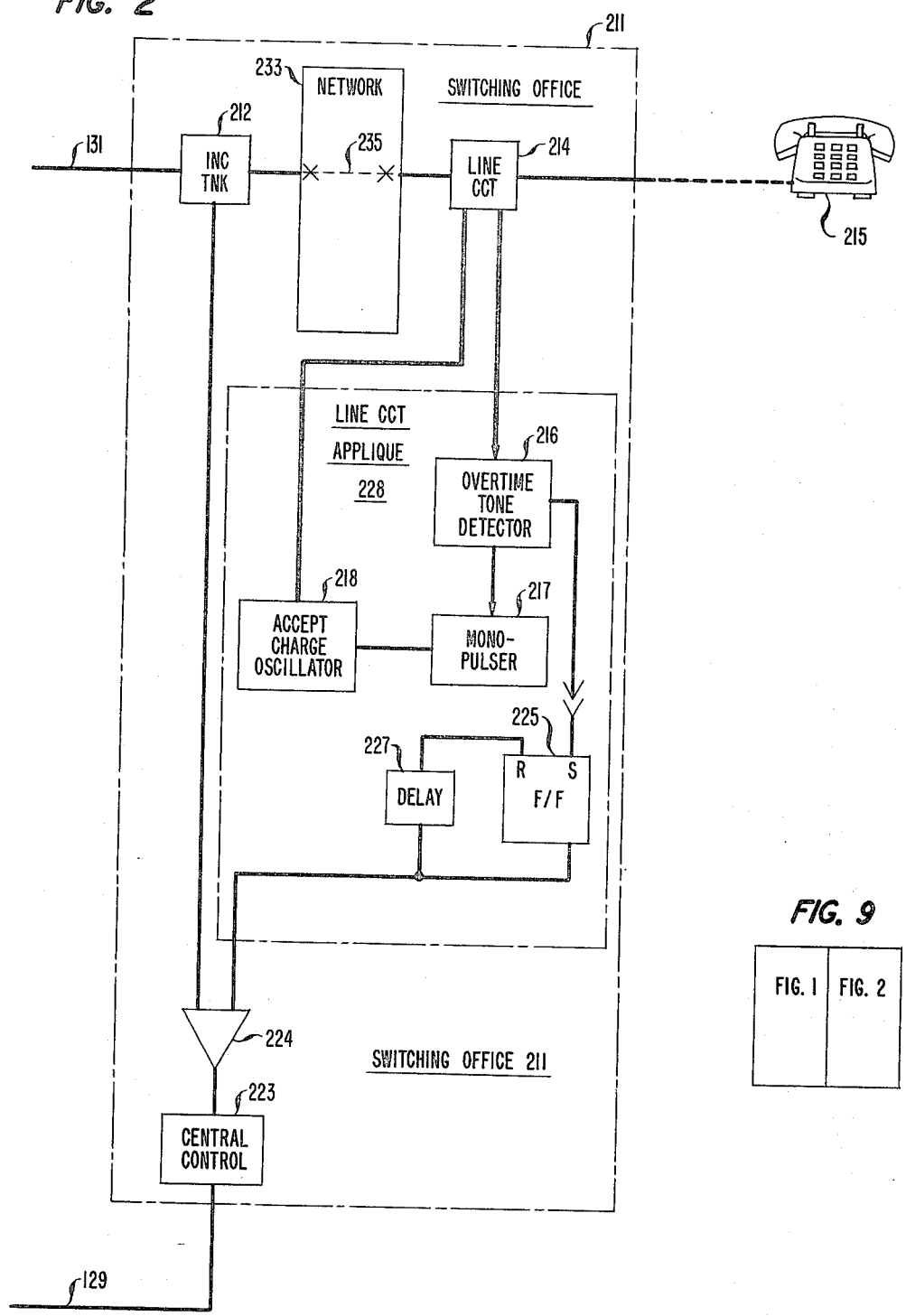

FIGS. 1 and 2 show one illustrative embodiment of the invention employed in telephone systems of the type disclosed in U.S. Pat. No. 3,408,628 to R. L. Brass et al of Oct. 29, 1968. Since many elements of the switching systems are well-known in the art, they will be shown in block diagram form. For a more complete disclosure of a typical electronic switching system the reader is referred to the above Brass et al patent, U.S. Pat. No. 2,955,165 to W. A. Budlong et al of Oct. 4, 1960, and *Bell System Technical Journal,* Volume XLIII, September, 1964.

The switching office 110 of FIG. 1 is controlled by a high speed electronic central processor including a central control 100 which is controlled by program instructions stored in a permanent memory designated program store 101. A temporary memory designated call store 102 is used to store transient information such as the digits dialed by a customer, the supervisory states of lines and trunks, etc.

The switching network 103 provides means for connecting customer line circuits, such as 104, with trunks, such as 105, and with service circuits such as coin service circuit 106.

The switching logic is contained in the program instructions and the hardware of the service circuits is purposely kept simple. By and large, the service circuits are actuated under commands from the central control 100 through the use of signal distributor 107. Signal distributor 107 comprises a plurality of bistable devices which are set and reset by central control 100 to actuate slower speed devices such as relays in the peripheral circuits.

Input information to central control 100 from the rest of the system is provided via scanner 108. The scanner is directed periodically to detect service requests from lines and the states of service circuits and trunks.

Figure 6:
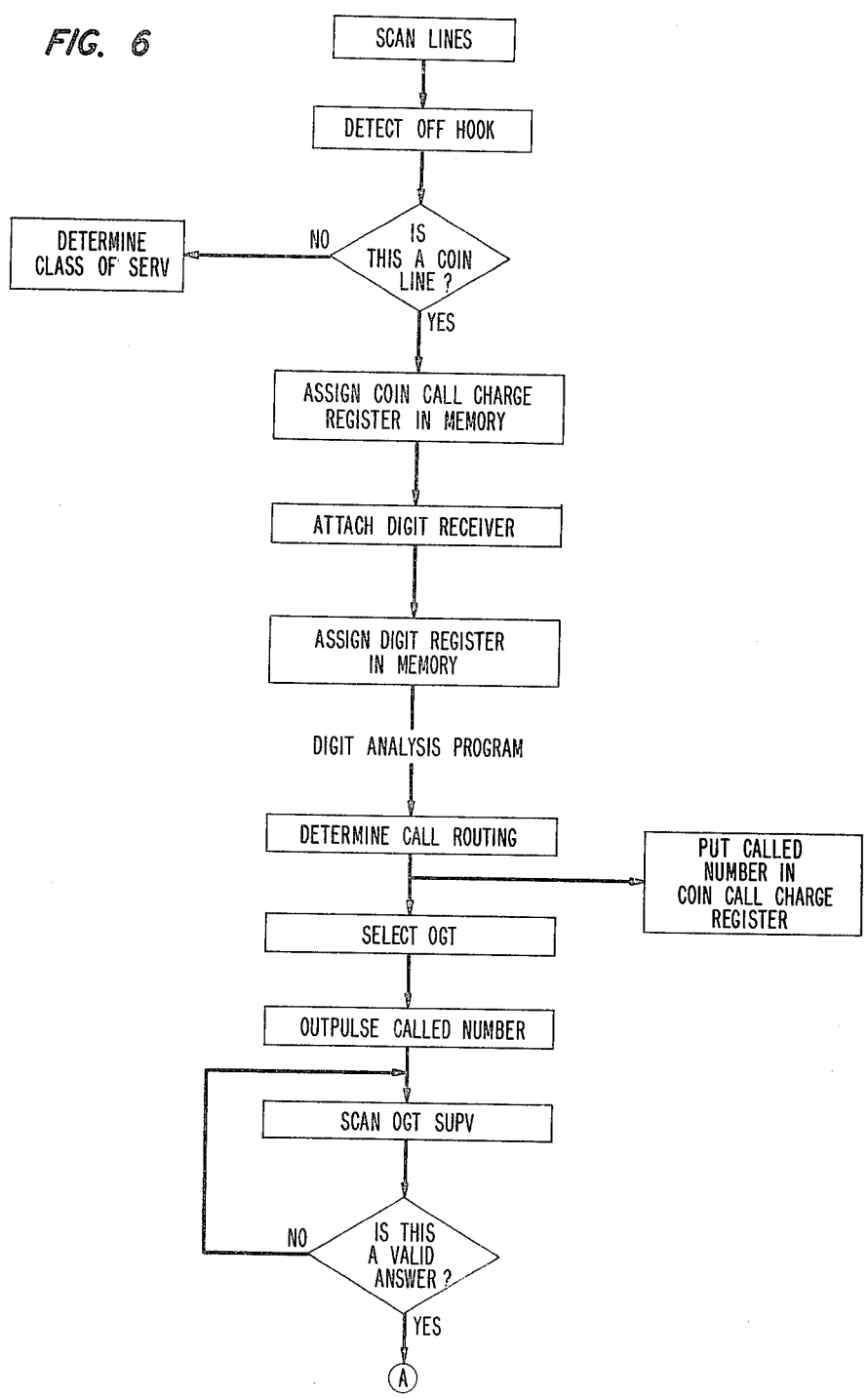
FIGS. 6, 7, and 8 show a flow diagram of the sequence of events in the operation of the switching office serving the coin station.
Figure 7:
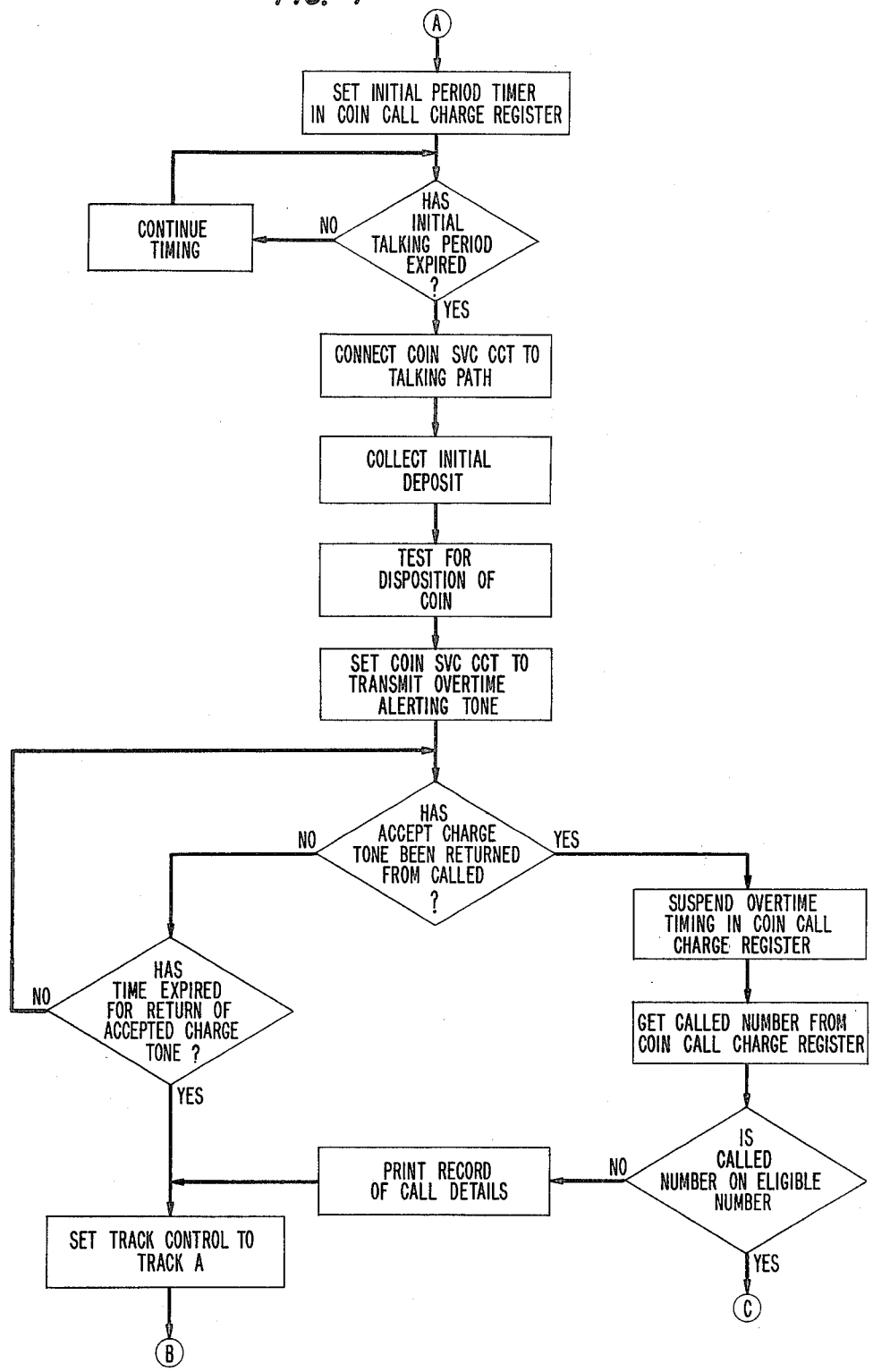
Figure 8:
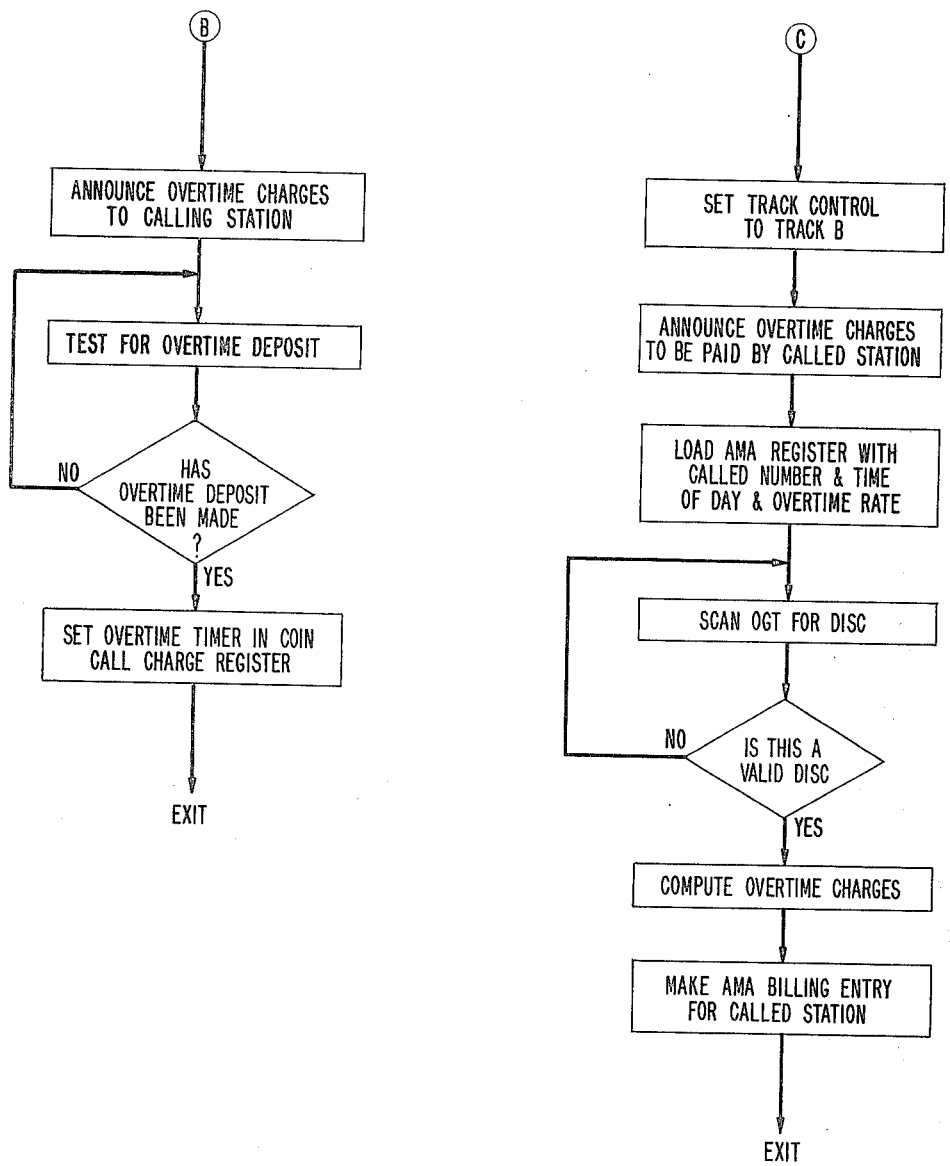

The overall operation of the arrangement will now be described with reference to FIGS. 1 and 2 and a call originated by coin station 109 to called station 215. The sequence of operation of the switching office 110 is also set forth in summary fashion in the flow diagram of FIGS. 6-8. The specific program instructions for performing these functions have not been shown since they depend on the particular switching system employed and can readily be generated from the flow diagram by one skilled in the art.

When a customer at coin station 109 wishes to place a call, he lifts the receiver at the station and deposits an initial amount. Line circuit 104 signals over conductor 130 to scanner 108 which is periodically directed by central control 100 to look for service requests. Central control 100 recognizes this service request by comparing the present scan information with the "last look" scan and connects a digit receiver (not shown) to the calling line 104 via network 103.

The digit receiver is responsive to the dial pulse or tone signals generated by station 109 and the receiver is scanned periodically by scanner 108 to ascertain the digits dialed by the calling customer. These digits are stored in a software register in call store 102.

When sufficient digits have been received, the digits are translated by a digit analysis program controlling central control 100 to ascertain the destination of the call. If it is assumed that the call is to station 215 served by switching office 211, an idle outgoing trunk such as 105 is selected. As set forth in the patents and technical journal cited above, an outpulser (not shown) is connected to the trunk via network 103 to outpulse the digits of the called station. At office 211 central control 223 senses a seizure on incoming trunk 212 and connects a digit receiver (not shown) to the incoming trunk to receive the digits outpulsed from switching office 110.

At the end of outpulsing, office 211 establishes two ringing connections for the call. A ringing generator circuit (not shown) is connected via network 233 to the called line circuit 214 to alert the customer at station 215 and an audible ringing tone service circuit (not shown) is connected via network 233 to incoming trunk 212. The audible ringing service circuit returns an audible signal over trunk conductors 131 to the calling office informing the calling station that the called station is being rung.

In the meantime, the calling office central control 100 has interconnected calling line 104 with outgoing trunk 105 via network connection 132 and central control 100 monitors trunk 105 for called answer supervision via scanner 108.

When the called party answers, a software timer is started at switching office 110 by central control 100 to time the initial talking period which has been paid for by the customer at coin station 109. At this time, the identities of the calling line and the called directory number are stored in the software register (shown in FIG. 3) in call store 102 along with the time of day that the call was initiated and answered.

Central control 100 monitors the supervision of the call at outgoing trunk 105 to determine when the parties disconnect and central control 100 also keeps track of the duration of the call to ascertain when the initial talking period has expired so that appropriate overtime charges can be assessed if the customers have not completed their conversation.

If it is assumed that the initial period expires before the customers have disconnected, central control 100 establishes two connections via the network to coin service circuit 106. Central control 100 temporarily interrupts the connection 132 between line circuit 104 and outgoing trunk 105 and connects coin service circuit 106 to the calling customer station via network connection 133 and to the outgoing trunk 105 via network connection 134. The talking path 132 is reserved for future use after the coin collect and overtime processing have been completed.

Central control 100 addresses signal distributor 107 to energize relay B in the coin service circuit 106 and relay B applies a coin collect potential over the connection 133 to the calling station to collect the initial deposit. A test is then performed to assure that the coin has been collected.

The winding of relay B and other relays have not been shown to simplify the drawing. It will be assumed, however, that these relays are similar to relays A and H whose windings are shown in FIG. 1.

Central control 100 now operates relay E in coin service circuit 106 for a prescribed interval and relay E, at its contacts E-1, connects overtime tone oscillator 121 over network path 134 to the distant office 211 and line circuit 214. Overtime tone oscillator 121 transmits a tone on the connection to alert the called station that the initial talking period has expired and any further conversation will require overtime charges.

If station 215 has been provided with the proposed "reverse overtime charge" service feature whereby it can accept the overtime charges, line circuit 214 serving station 215 will be equipped with line circuit applique 228. Applique 228 includes a tone detector 216, a monopulser 217, and an accept charge oscillator 218. Overtime tone detector 216 is responsive to the particular overtime tone generated by oscillator 121 in the coin service circuit at the originating office. In response to this tone, detector 216 triggers monopulser 217 which, in turn, triggers oscillator 218 for a prescribed interval and oscillator 218 transmits a distinct tone back over the connection to the calling office.

After central control 100 at switching office 110 operated relay E for a prescribed interval, it addressed signal distributor 107 to release relay E and actuate relay F in the coin service circuit 106. Relay F, at its contacts F-1, connects an accept charge tone detector 122 to network connection 134. Tone detector 122 is responsive to the tone generated by oscillator 218 in the line applique circuit 228 and when this tone is transmitted from the called office, the calling office is informed that the called customer is willing to accept overtime charge calls from the coin line.

In response to the tone from the called office, detector 122 actuates relay G in coin service circuit 106 and at its contacts G-1, relay G enables a scan point in scanner 108. Central control 100, during routine scanning, detects the operation of relay G and proceeds with the functions necessary to bill the called customer for the overtime charge and to advise the calling customer of the disposition of the call.

In accordance with a feature of the invention, coin service circuit 106 is connected to a 2-track announcement machine 119 that has recorded therein two messages which can be transmitted to the calling coin station to apprise the customer of the overtime charges. If the called customer does not wish to accept overtime charges or does not have this service feature, no tone will be returned to trigger detector 122. Recognizing this, central control 100 actuates relays A and G in coin service circuit 106. At its contacts G-2, relay G grounds conductor SELA to track control 120 in order to select track A of announcement machine 119. Relay A connects the output of the announcement machine over network connection 133 to the calling line. In this case, the announcement would inform the calling customer that the initial period has expired and an overtime deposit must be made in order to continue talking.

In the example described above, however, the called line applique circuit had signaled the calling office that the called customer would accept that overtime charges. Central control 100, therefore, actuates relays A, D, and G in the coin service circuit 106. Relays G and D ground conductor SELB to track control 120 so that the announcement machine will transmit an alternate message to the calling station. In this case, the calling customer will be informed that the initial period has expired, but that the called customer will accept any charges for overtime.

During call processing central control 100 keeps track of the call through the use of blocks of memory designated "call processing registers." The information needed for various functions during different stages of the call is not always the same in content and amount so the registers associated with different parts of the call will vary in size.

When processing a call from a coin telephone station, the central control establishes a coin call charge register such as the register shown in FIG. 3. This register contains the identity of the calling and called lines, the identity of the trunk being used on the call, the charging rate and timing information. This timing information is used by central control 100 to ascertain when the initial talking period expires.

After the central control ascertains that the overtime charges are to be billed to the called customer, the central control establishes an automatic message accounting register such as shown in FIG. 4. This register will be used for billing the called customer for overtime charges and contains the identity of the customer to be billed and the time of day that billing is to begin. The processor also makes an entry in the coin call register to indicate that the overtime no longer need be recorded for charging the coin station.

Returning now to the call being described, it will be recalled that the called customer line applique returned a signal to the calling office indicating the called customer's willingness to accept the overtime charges and the central control notified the calling customer of this arrangement through the use of announcement machine 119. At the end of the announcement, relay H is actuated in coin service circuit 106 and relay H, through its contacts H-1, signals central control that the announcement has been transmitted. Central control 100 disconnects network connections 133 and 134 and re-establishes a connection 132 between the calling line and the outgoing trunk.

Supervision of the call is periodically monitored at the outgoing trunk 105 and when the parties disconnect central control 100 will enter a disconnect time in the AMA register shown in FIG. 4. The information in the AMA register can be used to compute the billing of the overtime charges to the called customer in a well-known manner.

In the example described above, tones were exchanged between calling and called offices to ascertain which line would be assessed the overtime charges. To preclude customers from abusing this service and causing false charging, the arrangement can be provided with certain safeguards. For example, switching office 110 can have its program store equipped with a list, such as that shown in FIG. 5, of called customers that are provided with the reverse overtime charge feature. At some time during call processing, central control 100 would interrogate this memory using the called line number to ascertain if the reverse charge service feature had been provided for the called station. If the called number stored in the coin call register matches a number on the list, the overtime tone would be applied over the connection to the called office as described above.

Instead of keeping a list at each office of those customers provided with the reverse overtime charge feature, safeguard measures can be incorporated utilizing existing common channel interoffice signaling (CCIS) links such as link 129 in FIG. 1. As is well-known in the art, the CCIS system provides a data link between central processors for the exchange of supervisory, traffic control and other signals. As shown in FIG. 2, when the overtime tone detector 216 is triggered in the presence of overtime tone from the calling office, detector 216 also sets flip-flop 225. Flip-flop 225 resets itself after a delay determined by delay circuit 227 and flip-flop 225 energizes a scan point in scanner 224. Central control 223 at the called office can interrogate its memory to ascertain if the called line associated therewith is equipped to accept reverse overtime charge billing. Central control 123 can then inform originating office central control 100 via CCIS data link 129 and central control 100 would process the call as previously described.

While the arrangement has been described with respect to coin calls, it will be obvious to those skilled in the art that the invention is suitable for apportioning charges for other types of calls where overtime charges may be incurred.

For instance, charges could also be apportioned on calls originating from lines having message unit service wherein message units are charged for the initial period and for each additional interval of overtime that the parties converse. During the establishment of the call, the calling office central control would ascertain if the called party has the reverse charge overtime feature by the methods described above. A tag could be put in memory indicating that the call should be interrupted at the end of the initial period. When the initial period has expired, a service circuit would be coupled to the connection and the call would proceed substantially as described above with respect to the coin call. A detailed billing would then be prepared for both the calling and called stations.

It is to be understood that the above-identified arrangements are merely illustrative of the application and principles of the invention. Numerous other arrangements may be devised without departing from the spirit and scope of the invention.

For example, while the invention is shown being used on an interoffice connection, it is obvious that the invention could be employed on calls within the same switching office. Also, while tone oscillators are used for signaling over the connection, other signals such as coded signals could be used. Furthermore, the reverse overtime charge feature can be selectively activated under control of the called customer.

I claim:

1. An arrangement for apportioning charges on coin calls originating from a coin station and terminating at a called station wherein control means associated with the coin station applies an alerting signal to the established coin connection and wherein register means are provided for accumulating call billing data for calls served by said control means characterized by
    means associated with said called station and responsive to said alerting signal for transmitting an acceptance signal to said control means and said control means includes means responsive to said acceptance signal for actuating said register means to record a portion of the charges for said coin call for billing said called station.

2. The invention set forth in claim 1 further characterized by means for verifying that said acceptance signal was transmitted by said called station.

3. The invention set forth in claim 1 wherein said transmitting means comprises an oscillator for generating said acceptance signal and wherein said control means includes a tone detector responsive to said acceptance signal for signaling said actuating means.

4. The invention set forth in claim 1 wherein said control means also comprises means for transmitting a message to said coin station.

5. An arrangement for apportioning charges on coin calls originating from a coin station and terminating at a called station wherein a coin service circuit is actuated by a call processor to connect an overtime alerting signal to an established connection indicating the expiration of an initial talking period and wherein register means are provided for accumulating call billing data for calls served by said processor characterized by an announcement machine,
means coupled to said called station and responsive to said alerting signal for transmitting an acceptance signal over said connection,
means at said service circuit for detecting said acceptance signal, and
means responsive to said detecting means for causing said processor to actuate said register means and for causing said processor to couple said announcement machine to said connection.

6. The invention set forth in claim 5 wherein said announcement machine includes means for transmitting a plurality of messages and means for designating different ones of said messages for transmission to said coin station and wherein said designating means includes means selectively activated by said processor in accordance with the actuation of said detecting means.

7. The invention set forth in claim 6 wherein said processor includes a memory containing the address of called stations provided with acceptance signal transmitting means and means for interrogating said memory with the called station identity.

8. For use in a stored program controlled telephone system having a calling coin station and called station, a processor for establishing a talking connection between said stations, a coin service circuit controlled by said processor for applying an overtime alerting signal to said talking connection, and means controlled by said processor for billing the overtime charges for said talking connection characterized by first detector means coupled to said talking connection at the called station for detecting said alerting signal,
means activated by said first detector means for transmitting an acceptance signal over said talking connection to said calling coin station,
a second detector coupled to said talking connection and responsive to said acceptance signal, and
means in said processor actuated by said second detector for actuating said billing means to compute the overtime charges for said connection.

9. The invention set forth in claim 8 wherein said transmitting means also includes means for sending to the said processor a signal over a path separate from said talking connection to verify the transmittal of said acceptance signal over said talking connection.

10. A method for charging predetermined called stations for overtime charges on calls originating from calling stations comprising the steps of signaling the called station of the expiration of the initial talking period which was paid for by the calling station, having the called station transmit an accept signal to the calling station indicating that the called station is willing to accept the overtime charges, measuring the time from the recognition of the accept signal until the call is disconnected, and storing the measured time and charges in a register associated for billing purposes with the called station.

11. The method of claim 10 further comprising the step of announcing to the calling station that the overtime charges will be accepted by the called station.

* * * * *

UNITED STATES PATENT AND TRADEMARK OFFICE
CERTIFICATE OF CORRECTION

PATENT NO. : 4,224,472
DATED : September 23, 1980
INVENTOR(S) : Alfred Zarouni

It is certified that error appears in the above-identified patent and that said Letters Patent are hereby corrected as shown below:

On the Title Page, inventor's last name, "Zarount" should read --Zarouni--.

Signed and Sealed this

Ninth Day of June 1981

[SEAL]

Attest:

RENE D. TEGTMEYER

Attesting Officer

Acting Commissioner of Patents and Trademarks